US006959538B2

(12) United States Patent
Cho et al.

(10) Patent No.: US 6,959,538 B2
(45) Date of Patent: Nov. 1, 2005

(54) ULTRA LOW POWER PLASMA REACTOR SYSTEM FOR AUTOMOTIVE NOX EMISSION CONTROL

(75) Inventors: Byong Kwon Cho, Rochester Hills, MI (US); Steven Jeffrey Schmieg, Troy, MI (US); Se Hyuck Oh, Troy, MI (US)

(73) Assignee: General Motors Corporation, Detroit, MI (US)

( * ) Notice: Subject to any disclaimer, the term of this patent is extended or adjusted under 35 U.S.C. 154(b) by 88 days.

(21) Appl. No.: 10/313,311

(22) Filed: Dec. 6, 2002

(65) Prior Publication Data

US 2004/0107695 A1 Jun. 10, 2004

(51) Int. Cl.$^7$ ............................................... F01N 3/00
(52) U.S. Cl. ............................ 60/275; 60/274; 60/286
(58) Field of Search ......................... 60/274, 275, 286, 60/299; 204/164, 177, 179; 422/186.04; 423/235

(56) References Cited

U.S. PATENT DOCUMENTS

| 4,871,515 | A | | 10/1989 | Reichle et al. ............... 422/174 |
|---|---|---|---|---|
| 5,728,253 | A | | 3/1998 | Saito et al. ............. 156/345.25 |
| 5,746,984 | A | * | 5/1998 | Hoard .......................... 422/169 |
| 5,855,855 | A | | 1/1999 | Williamson et al. ... 422/185.04 |
| 6,176,078 | B1 | * | 1/2001 | Balko et al. ................... 60/274 |
| 6,264,899 | B1 | * | 7/2001 | Caren et al. .............. 422/186.3 |
| 6,357,223 | B1 | * | 3/2002 | Caren et al. ................... 60/274 |
| 6,363,716 | B1 | | 4/2002 | Balko et al. ................... 60/286 |
| 6,560,958 | B1 | * | 5/2003 | Bromberg et al. ............. 60/275 |

FOREIGN PATENT DOCUMENTS

JP 061212952 1/1999

OTHER PUBLICATIONS

"Comparison of Electrical Discharge Techniques for Non-thermal Plasma Processing of NO in $N_2$" IEEE, V. 23, No. 4, p. 679 (Aug. 1995).

"Plasma Enhanced Selective Catalytic Reduction: Kinetics of $NO_x$ Removal and Byproduct Formation", SAE Publication 1999–01–3632 (1999).

"Diesel $NO_x$ Reduction on Surfaces in Plasma", SAE Publication 982511 (1998).

"Vehicle Exhaust Treatment Using Electrical Discharge Methods", SAE Publication 971716 (1997).

U.S. patent application Ser. No. 10/269,235, Byong K. Cho et al., pending appl.

* cited by examiner

Primary Examiner—Thomas Denion
Assistant Examiner—Diem Tran
(74) Attorney, Agent, or Firm—Kathryn A. Marra

(57) ABSTRACT

A sidestream located hyper-plasma reactor having an axially discrete pattern of alternating regions of active and passive electric field along the axial direction. The hyper-plasma reactor has great efficacy in terms of ultra low power consumption and copious production of $NO_x$ converting aldehydes in the absence of NO by applying plasma power only to an air and hydrocarbon mix sidestream gas flow. Only a small fraction (1% to 2%) of plasma power is required as compared to that for a conventional plasma reactor to treat the full exhaust gas stream. The hyper-plasma reactor produces ozone which reacts subsequently with hydrocarbons to produce aldehydes ("ozonolysis"). The sidestream location of the hyper-plasma reactor allows for the full exhaust stream to bypass it, without significantly affecting the overall $NO_x$ conversion performance in the catalytic converter.

14 Claims, 8 Drawing Sheets

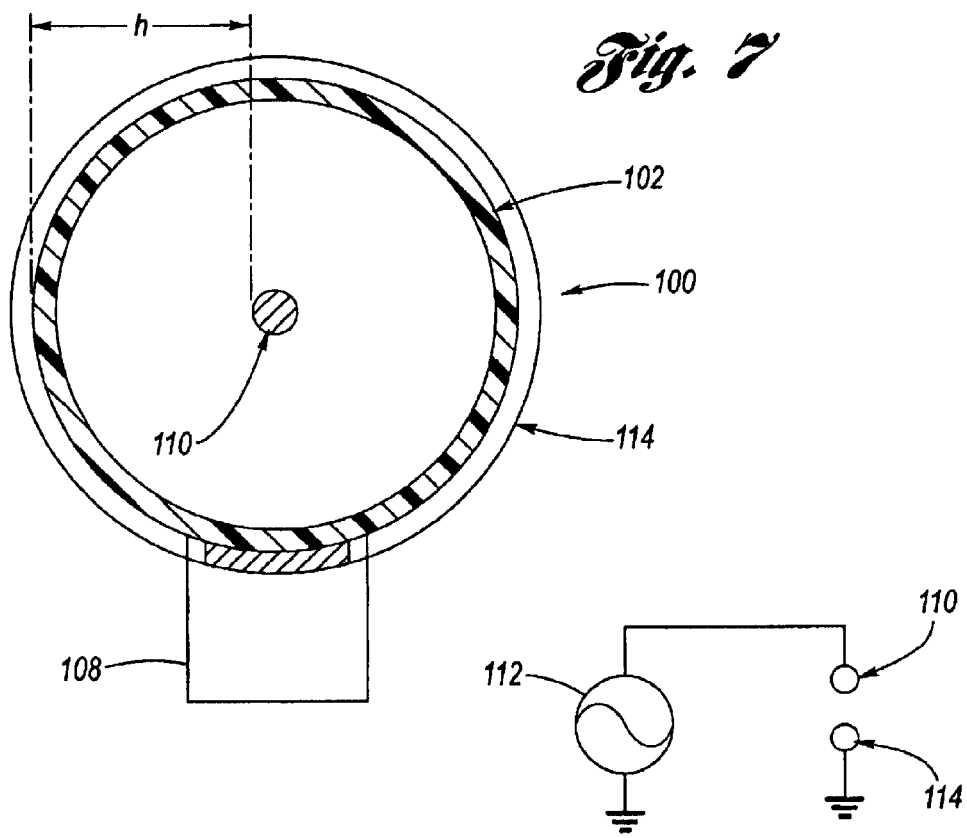
Fig. 7
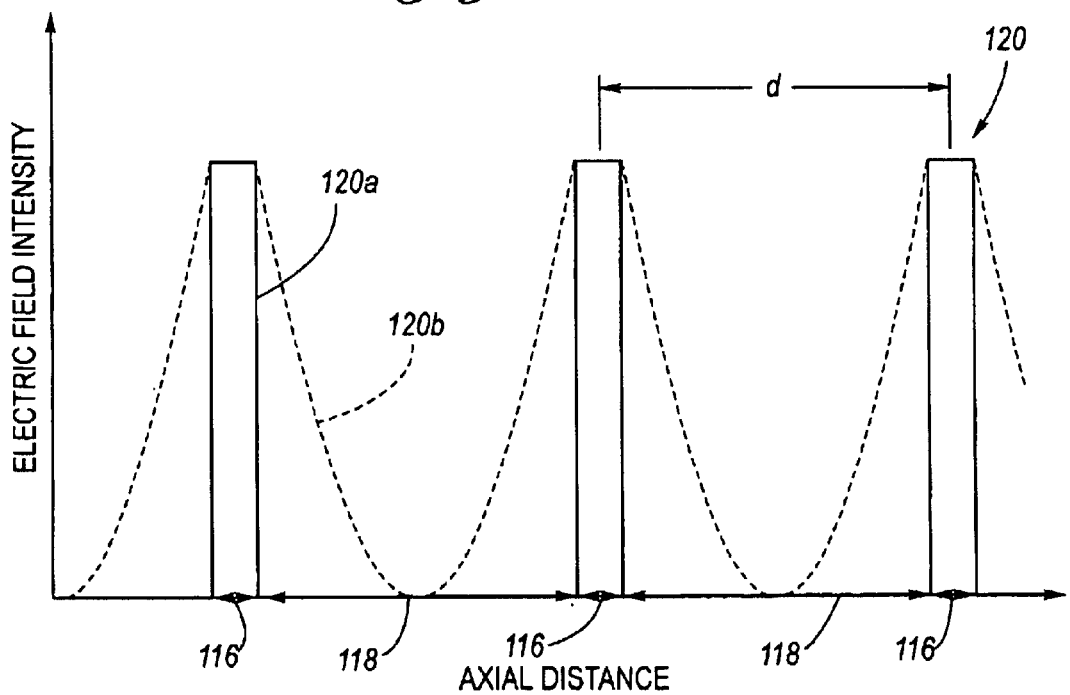
Fig. 8
Fig. 9

ULTRA LOW POWER PLASMA REACTOR SYSTEM FOR AUTOMOTIVE NOX EMISSION CONTROL

TECHNICAL FIELD

The present invention relates to plasma reactors and catalytic converters used to reduce $NO_x$ of internal combustion engine exhaust, and more particularly to a plasma reactor and catalytic converter based $NO_x$ reduction system featuring a hyper-plasma reactor operating at an ultra low power placed in a side-stream location in relation to the main exhaust stream for producing copious amounts of $NO_x$ reducing aldehydes upstream of the catalytic converter.

BACKGROUND OF THE INVENTION

The removal of nitrogen oxides ($NO_x$) from internal combustion exhaust is an increasing concern, especially for lean-burn engines such as direct injection gasoline engines and Diesel engines. One method for post combustion $NO_x$ removal is the subjection of the exhaust gases to a non-thermal plasma process. In this regard, the exhaust gas is passed through a plasma processing device whereat a high voltage electric field imparts formation of a plasma. The plasma has a large number of energetic electrons which collide with exhaust gas molecules to form atoms, ions and radicals. These atoms, ions and radicals, in turn, react either with the NO to make $NO_2$ or with hydrocarbons to produce aldehydes. The produced aldehhydes subsequently reduce $NO_x$ over suitable catalysts to make harmless nitrogen. Thus, the major role of the plasma reactor is to produce $NO_2$ from NO and aldehydes from hydrocarbons in the combustion exhaust stream. Among the aldehydes produced in the plasma reactor, acetaldehyde ($CH_3CHO$) is known to be the most effective for $NO_2$ reduction over alkali-based catalysts.

FIGS. 1A through 1C depict three prior plasma reactors, wherein the external high voltage source is either pulsating D.C. or A.C.

FIG. 1 depicts a first form of plasma reactor 10, referred to commonly as a pulsed corona discharge plasma reactor, in which a conductive metallic tube 12 defines the reactor wall 14, and inside of which exhaust gas G passes along. Axially along the concentric center of the tube 12 is a conductive high voltage electrode rod 16. The central electrode rod 16 is electrified by an external high voltage source with the tube 12 serving as the ground electrode, wherein a corona is formed therebetween without sparking which induces plasma formation of the exhaust gas.

FIG. 2 depicts a second form of plasma reactor 10', referred to commonly as a dielectric barrier discharge plasma reactor, in which a conductive metallic tube 22 and an insular dielectric layer 24, which is concentrically disposed at the inside surface of the tube collectively define the reactor wall 26. As in the first form of plasma reactor 10, exhaust gas G passes along the interior of the reactor wall 26, and a conductive high voltage electrode rod 28 is located axially along the concentric center of the tube 22. The central electrode rod 28 is electrified by an external high voltage source with the tube 22 serving as the ground electrode, wherein the dielectric layer 24 becomes polarized. The polarization of the dielectric layer 24 stores energy which serves to aid the inducement of the plasma formation of the exhaust gas without sparking.

FIG. 3 depicts a third form of plasma reactor 10", commonly referred to as a dielectric packed-bed discharge plasma reactor, in which, as in the second form of plasma reactor 10', a conductive metallic tube 32 and an insular dielectric layer 34, which is concentrically disposed at the inside surface of the tube, collectively define the reactor wall 36, wherein exhaust gas G passes along the interior of the reactor wall 36, and a conductive high voltage electrode rod 38 is located axially along the concentric center of the tube 32. A plurality of small insular dielectric pellets 40 loosely fill the interior of the reactor wall 36 such that the exhaust gas G is easily able to travel through the spaces therebetween. The central electrode rod 38 is electrified by an external high voltage source with the tube 32 serving as the ground electrode, wherein the dielectric layer 34 becomes polarized, and each of the pellets 40 becomes locally polarized, as well. The polarization of the dielectric layer 34 and of the local polarization of the pellets 40 store energy which serves to aid the inducement of the plasma formation of the exhaust gas without sparking.

In the prior art, the plasma reactor wall may have either a flat or cylindrical geometry, and the electrodes are typically made of continuous electrical conductors, so that a uniformly active electrical field is formed in the air gap therebetween to generate a plasma of maximum intensity for a given voltage. Prior art plasma reactors emphasize production of a high intensity plasma based on an implicit assumption that the plasma intensity is the limiting factor of the underlying process. The continuous electrodes utilized in the prior art plasma reactors may be suitable for operating conditions where the supply of high energy electrons is the rate limiting step of the plasma reaction. However, when the rate limiting step is other than the electron supply, an increase in input energy above a certain value through the continuous electrodes will hardly improve the overall performance of the plasma process.

The inventors of the present invention, while investigating plasma-assisted lean $NO_x$ catalysis, have discovered that the limiting factor of the plasma reaction process is not the intensity of the plasma but the diffusion, mass transfer and chemical reaction of intermediates (such as atoms, ions and radicals) produced in the plasma under the operating conditions of a typical automotive engine exhaust gas stream. Thus, it is important to promote the diffusion, mass transfer and chemical reaction processes of atoms, ions and radicals in the plasma reactor in order to improve the overall performance of the $NO_x$ reduction process in the engine exhaust. In this regard, it is noted that energy is invested in the dielectric layer of prior art plasma reactors without an efficient pay-out with respect to the plasma energy in terms of encouraging maximal reaction of the atoms, ions and radicals with respect to the $NO_x$ and hydrocarbons.

As FIG. 4 depicts, in a typical engine exhaust treatment system 50 using plasma reactor technology, the engine exhaust stream G passes first through the plasma reactor 52 and then through $deNO_x$ catalysts at the catalytic converter 54. The major role of the plasma reactor is to convert NO and hydrocarbons in the exhaust stream to $NO_2$ and partially oxidized hydrocarbons, such as aldehydes, respectively. In this system, the electrical energy requirement for the plasma reactor is about 20 to 30 J/L, which amounts to a power requirement of 600 to 900 W for an exhaust flow rate of 30 L/s. This prohibitively large power requirement for the plasma reactor is one of the most severe technological barriers to widespread vehicle implementation of this technology.

Accordingly, what remains needed in the art is to somehow provide a copious amount of aldehydes in the exhaust upstream of the catalytic converter by using a plasma reactor operating at ultra low power.

SUMMARY OF THE INVENTION

During a study by the inventors hereof of plasma-assisted lean $NO_x$ catalysis using simulated engine exhaust gases, identified was the mass transfer/chemical reaction rate of ionized reactant species (not the electron supply) as the rate limiting step of the plasma process under typical operating conditions. It is the present inventors' discovery that an increase of mass transfer/chemical reaction rate of the ionized reactants can be achieved by arranging the ground electrode in discrete locations along the axial length of the plasma reactor, which thereby provides passive regions therebetween serving as effective mass transfer/chemical reaction areas.

Further during the plasma-assisted lean $NO_x$ catalysis investigation, the inventors of the present invention learned that the key factor of this particular process is the production of acetaldehyde from hydrocarbons in the plasma reactor. It has been known that aldehydes can be produced from hydrocarbons by a plasma reactor in the presence of NO (according to literature reports, the aldehyde production is negligible in the absence of NO in the plasma reactor). Different from this well-established prior art kinetic mechanism of aldehyde production in the plasma reactor, the present invention is a novel hyper-plasma reactor which can produce acetaldehyde from hydrocarbons in the absence of NO in the gas stream passing therethrough. This discovery has led the present inventors to propose a new reaction mechanism for aldehyde production in a plasma reactor: "ozonolysis of hydrocarbon". The validity of this new reaction mechanism was confirmed by an independent measurement of ozone concentration in the hyper-plasma reactor. The unique capability of the hyper-plasma reactor according to the present invention to produce acetaldehyde in the absence of NO enabled the present inventors to develop a novel method of $NO_x$ reduction in Diesel engine exhausts, which requires only a fraction (1% to 2%) of the plasma energy typically needed for a conventional plasma reactor system through the use of a unique sidestream placement hyper-plasma reactor.

The hyper-plasma reactor according to the present invention is configured such that the high voltage (inner) electrode is axially oriented at a concentrically central location with respect to a dielectric plasma wall, and a ground (outer) electrode has an axially discrete pattern, as for example a spiral pattern, which provides alternating regions of active and passive electric field. The dielectric plasma wall is interfaced at an upstream end to a source of pressurized air and is interfaced at the other end to a tube connected to the exhaust gas stream. The upstream end is also connected to a source of hydrocarbons, as for example fuel vapor. This configuration is referred to herein as a "sidestream" relation of the hyper-plasma reactor relative to the exhaust gas stream.

In operation, the inner electrode is connected to a source of varying high voltage and the outer electrode to ground, thereby providing successive active regions and passive regions axially along the hyper-plasma reactor. The incoming air mixed with hydrocarbons goes through plasma reactions at each active region, followed by a chemical reaction relaxation in the following passive region. In this regard, because each active region is axially compact, an intense generation of energetic electrons occurs thereat; because each passive region is axially extended, sufficient time is provided for the resulting oxidation processes before the next active region is encountered. Accordingly, the energy consumption in relation to the production of aldehydes is extremely favorable.

This favorable result can be explained as follows. Since the ion and radical velocity depends on the strength of the electric field, these velocities in the radial direction (transverse to the axial direction) are faster in the active regions than in the passive regions. This velocity gradient in the radial direction, with the help of the spatially alternating electric field, promotes axial mixing of ionized reaction intermediates, resulting in an enhanced reactivity with the hydrocarbons. This mixing, in turn, means that the hyper-plasma reactor according to the present invention requires much less energy to operate than the prior art plasma reactors, and far more compact, to achieve the same level of performance.

The hyper-plasma reactor $NO_x$ reduction system according to the present invention has great efficacy in terms of ultra low power consumption and copious production of aldehydes in the absence of NO. The present invention eliminates unnecessary power consumption applied to the full exhaust gas stream, by applying plasma power only to the sidestream gas flow containing air and hydrocarbons to produce aldehydes. Accordingly, only a small fraction (1% to 2%) of plasma power is required as compared to that for a conventional plasma reactor to treat the full exhaust gas stream. The hyper-plasma reactor produces ozone which reacts subsequently with hydrocarbons to produce aldehydes ("ozonolysis"). The sidestream location of the hyper-plasma reactor allows for the full exhaust stream to bypass it, without significantly affecting the overall $NO_x$ conversion performance in the catalytic converter. Further, the sidestream location of hyper-plasma reactor allows control of the hyper-plasma reactor operating conditions independently of the catalytic ($deNO_x$ catalyst) converter and the main exhaust stream.

Objects, features and advantages of the present invention will become clearer from the following specification of a preferred embodiment.

BRIEF DESCRIPTION OF THE DRAWINGS

FIG. 7 is a sectional end view, seen along line 7—7 of FIG. 6.

FIG. 8 is a schematic diagram of an electrical circuit for the hyper-plasma reactor of FIG. 5.

FIG. 9 is a graphical plot of axial distance versus electric field intensity of the hyper-plasma reactor of FIG. 5.

DESCRIPTION OF THE PREFERRED EMBODIMENT

Figure 1:
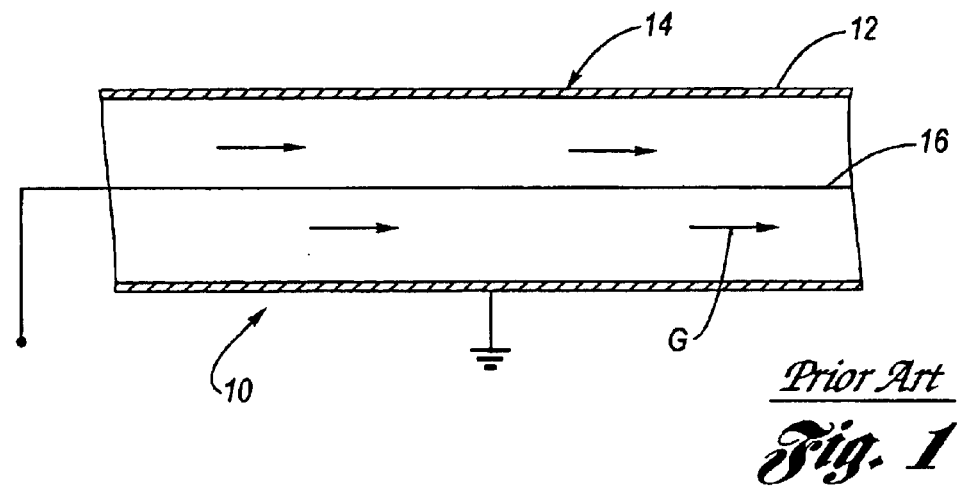
FIGS. 1 through 3 are partly sectional side views of prior art plasma reactors.
Figure 2:
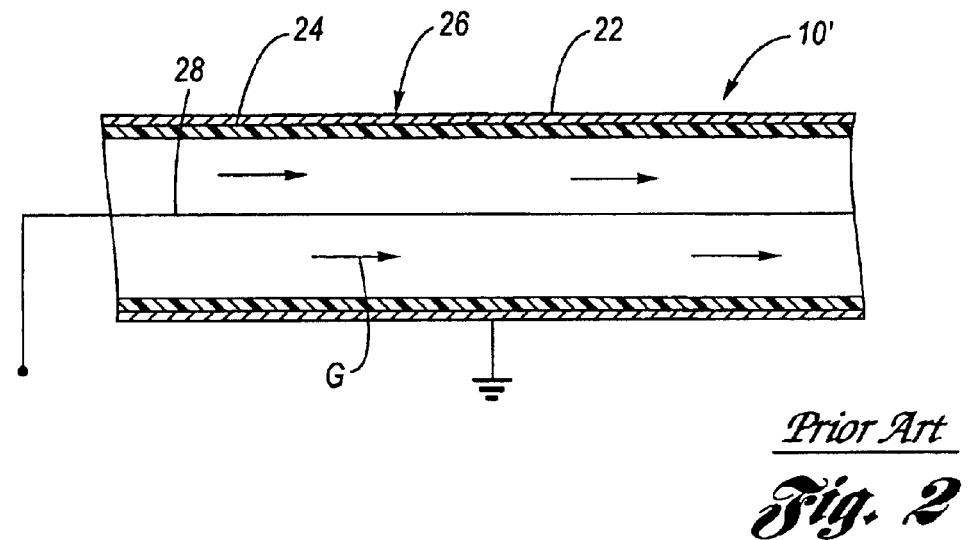
Figure 3:
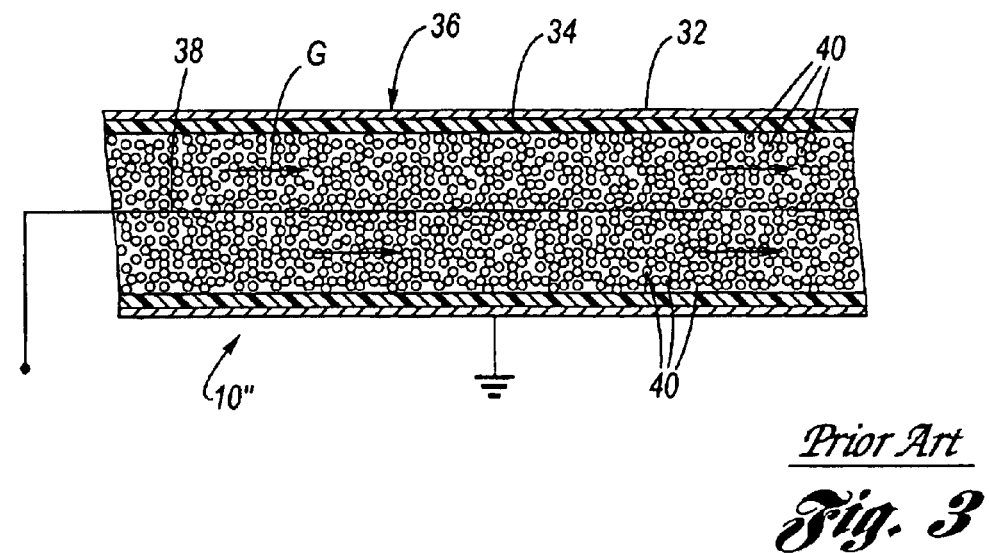
Figure 4:
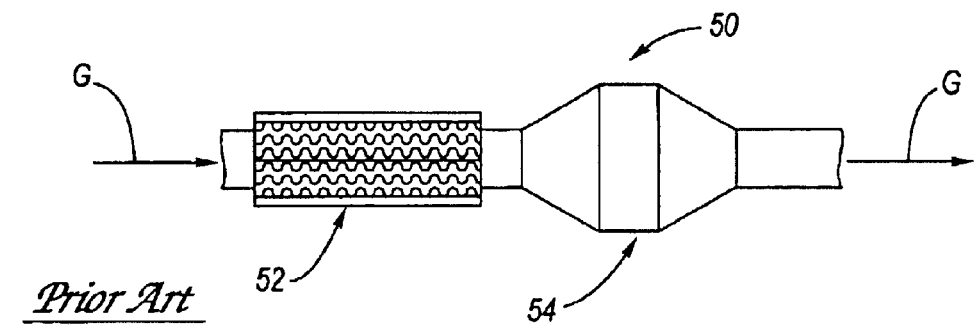
FIG. 4 is a schematic view of a prior art plasma reactor and catalytic converter in an exhaust gas $NO_x$ removal system.
Figure 5:
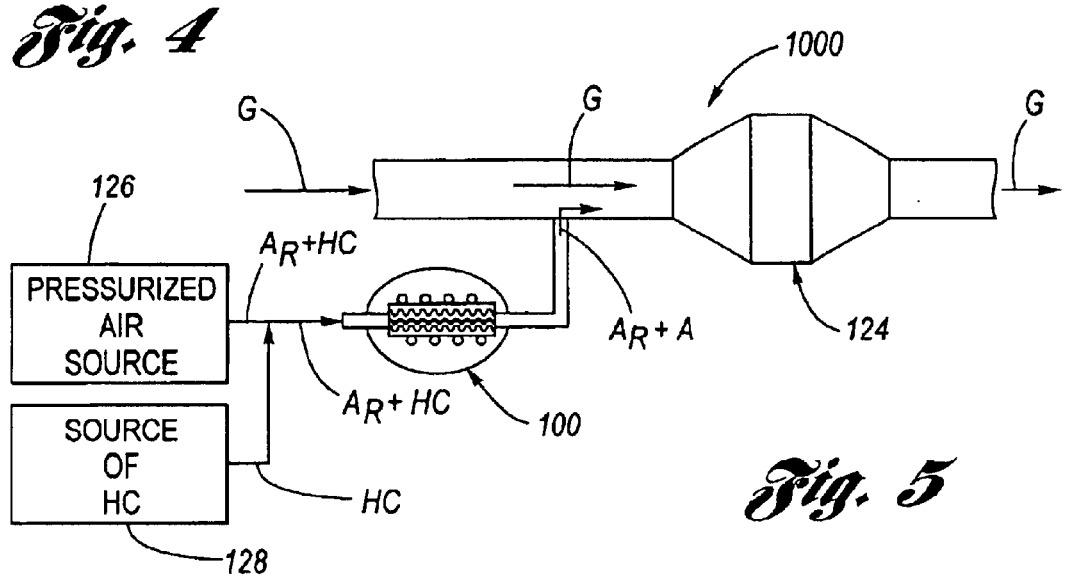
FIG. 5 is a schematic view of a hyper-plasma reactor and catalytic converter in an exhaust gas $NO_x$ removal system according to the present invention.
Figure 6:
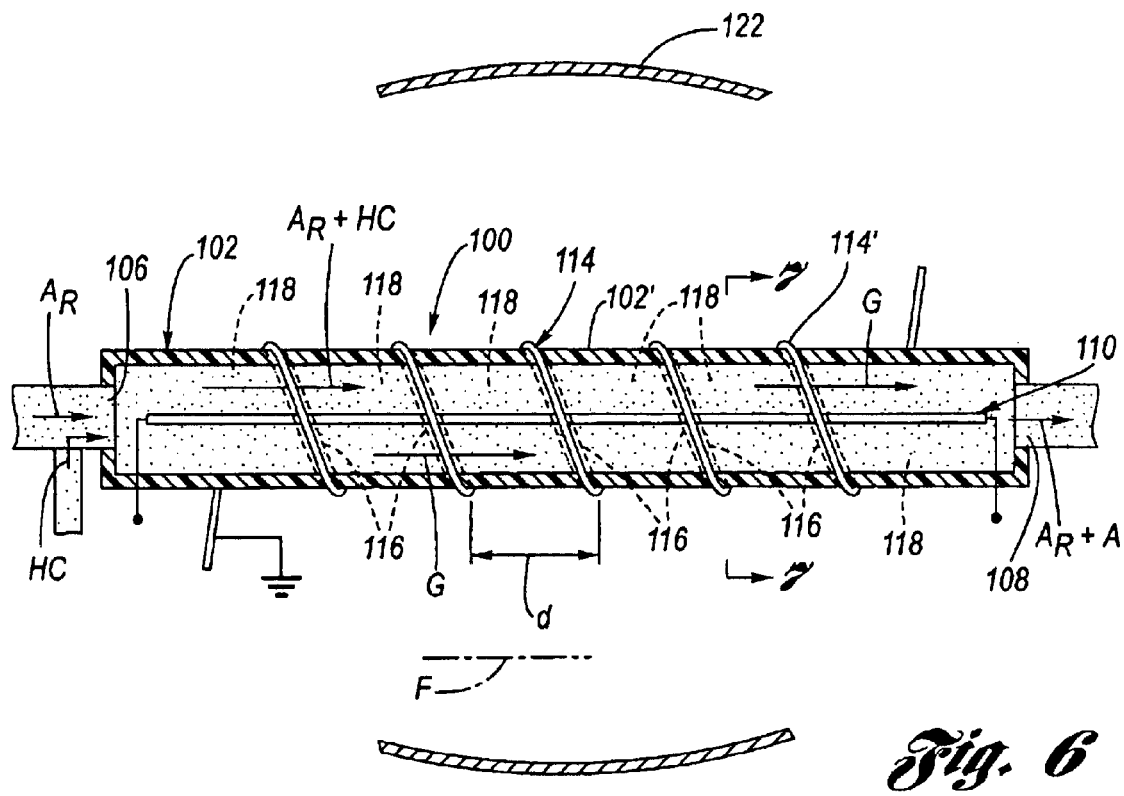
FIG. 6 is a partly sectional side view of the hyper-plasma reactor of FIG. 5.

Referring now to the Drawing, FIGS. 5 through 16 depict various aspects of an example of an automotive exhaust gas hyper-plasma reactor and catalytic converter system 1000 according to the present invention, wherein a hyper-plasma reactor 100 thereof features serially alternating regions of active and passive electric field along its axial length, and wherein the hyper-plasma reactor is located in a sidestream relationship with respect to the main exhaust stream, as shown at FIG. 5.

As depicted at FIGS. 6 through 9, the hyper-plasma reactor 100 according to the present invention has an elongated cylindrical configuration defined by a plasma reactor wall 102 composed of an insular dielectric material 102' which serves as a dielectric barrier and defines a reactor space thereinside. The composition of the plasma reactor wall 102 may be any suitable dielectric material, as for example quartz, glass, alumina, etc. By way merely of exemplification and not limitation, the dielectric material may be a quartz tube having a three-eighths inch outside diameter and a wall thickness of 1 mm. An inlet 106 is located at one end of the plasma reactor wall 102, and an outlet 108 is located at the other end of the plasma reactor wall. A protective metallic shell 122 covers the hyper-plasma reactor 100 (shown broken-away for clarity).

A high voltage electrically conductive central (inner) electrode rod 110 is located at the concentric center of the plasma reactor wall 102. The central electrode rod 110 extends generally coterminally with the plasma wall, and is anchored thereto. The central electrode rod 110 may be composed of any suitable electrically conductive material, as for example stainless steel, aluminum, copper, etc. By way merely of exemplification and not limitation, the central electrode rod 110 may be composed of stainless steel, having a diameter of one-eighth inch. The central electrode rod 110 is connected to the high voltage output of a time variant high voltage source 112 (see FIG. 8). A dielectric material may cover the central electrode rod, for example for the purpose of electrode protection from a corrosive exhaust gas environment.

An electrically conductive ground (outer) electrode 114 is in the form of a wire 114' (by "wire" is meant to include all equivalents thereof, as for example narrow, thin electrically conducting film) which is wound tightly (contactingly) around the plasma reactor wall 102, having a selected pitch which provides an axially discrete spacing d. In this regard, the ground electrode is arranged in a sequential pattern comprising a series of discretely spaced apart locations, the sequential pattern being arranged with respect to the axis F along which air mixed with hydrocarbons flows (see below). The pitch may be such as to provide coarse spacing (preferred), close spacing, constant spacing (preferred) or variable spacing. The ground electrode 114 is connected to ground of the high voltage source 112. By way merely of exemplification and not limitation, the ground electrode 114 may be composed of small gauge copper/nickel wire coiled tightly around the plasma reactor wall 102.

The outer surface area of the plasma reactor wall 102 which is in local contact with the (wire 114' of the) ground electrode 114 defines an active region 116 of the electric field formed by the voltaic interaction between the electrode rod 110 and the ground electrode, wherein the electric field is moderated by polarization of the dielectric material of the plasma reactor wall 102. The space between the active regions 116 axially along the plasma reactor wall 102 constitute passive regions 118 of the electric field. The active regions 116 of the electric field have higher field intensity than the passive regions 118, wherein the resulting axially varying electric field is represented by the plot 120 of FIG. 9.

In FIG. 9, the axial locations 120a of the ground electrode and its associated active region of electric field intensity are shown by the rectangular solid line bars. The nonuniform electric field intensity 120b is shown by the dashed lines. The smooth transition of the nonuniform electric field intensity between the active and passive regions 116, 118 is due to the free drift of high energy electrons from the active regions to the passive regions, which results from the physical nature of the free boundary between the active and passive regions.

It has been determined that optimization of the active and passive regions of the electric field in a plasma reactor 100 according to the present invention can be represented by the relation:

$$d \approx h \cdot \cos(\pi/3), \quad (1)$$

wherein d (as for example shown at FIG. 6) is the distance between the mutually adjoining active and the passive regions (i.e., the axial length of the passive regions), and wherein h (as for example shown at FIG. 7) is the shortest distance between the central electrode rod and the outer ground electrode. The exact value of d depends on the specific kinetics of the chemical reaction occurring in the plasma reactor.

An experiment demonstrating a successful implementation of the plasma reactor 100 was conducted using a simulated engine exhaust gas mixture. Observed was a bright annular region between the central electrode rod and the (quartz tube) dielectric plasma reactor wall, which brightness represented the exhaust gas plasma. On the outer surface of the plasma reactor wall, observed were bright regions adjacent to the spiraling wire of the outer ground electrode, which represented the active regions of the electric field. Also observed on the outer surface of the plasma reactor wall were dark regions between the bright regions, which represented the passive regions of the electric field. Despite this clear distinction between the active and passive regions of the electric field as shown on the outer surface of the (dielectric barrier) plasma reactor wall, the plasma intensity in the annular region was observed to be almost uniform, indicating a good gas phase mixing in the plasma. This result can be explained as follows. Since the ion velocity depends on the strength of the electric field, it is faster in the active regions of the electric field than in the passive regions of the electric field. This, with the help of the spatially alternating electric field, promotes axial mixing of ionized reaction intermediates, resulting in an enhanced reactivity of the $NO_x$.

Returning now to FIG. 5, it will be seen that the aforedescribed hyper-plasma reactor 100 is located at a sidestream location with respect to the main exhaust stream G, at a location upstream of the catalytic converter 124. The catalytic converter 124 is any suitable for performing $deNO_x$ catalysis, as for example using a NaY catalyst.

Entering the inlet 106 is air $A_R$ originating from any suitable pressurized air source 126, which may be, for example, a blower. Also entering the inlet 106 is a stream of hydrocarbon molecules HC originating from any suitable source 128, such as for example a tube connecting to a source of fuel vapor or a connection tapping a small quantity of the engine exhaust upstream of the catalytic converter. This hydrocarbon bearing air $A_R$+HC now passes through the hyper-plasma reactor 100.

In operation, the inner electrode 110 is connected to a source of varying high voltage 112 and the outer electrode 114 to ground, thereby providing successive active regions 116 and passive regions 118 along the hyper-plasma reactor in the direction of the AR+HC flow axis F. The incoming air mixed with hydrocarbons goes through plasma reactions at each active region, followed by a chemical reaction relaxation in the following passive region. In this regard, because each active region is axially compact, an intense generation of energetic electrons occurs thereat; because each passive region is axially extended, sufficient time is provided for the resulting oxidation processes before the next active region is encountered. As a result, copious aldehydes are produced, wherein the energy consumption in relation to the production of aldehydes is extremely favorable. This aldehyde laden air AR+A then proceeds to the catalytic converter 124 where the aldehydes provide reaction for the $NO_x$ reduction catalysis.

Turning attention now to FIGS. 11 through 16, various test results of operational characteristics of the hyper-plasma reactor 100 in combination with a catalytic converter 124 will be described. In this regard, FIGS. 10A and 10B depict Diesel engine dynamometer facilities for the test results.

Figure 10A:
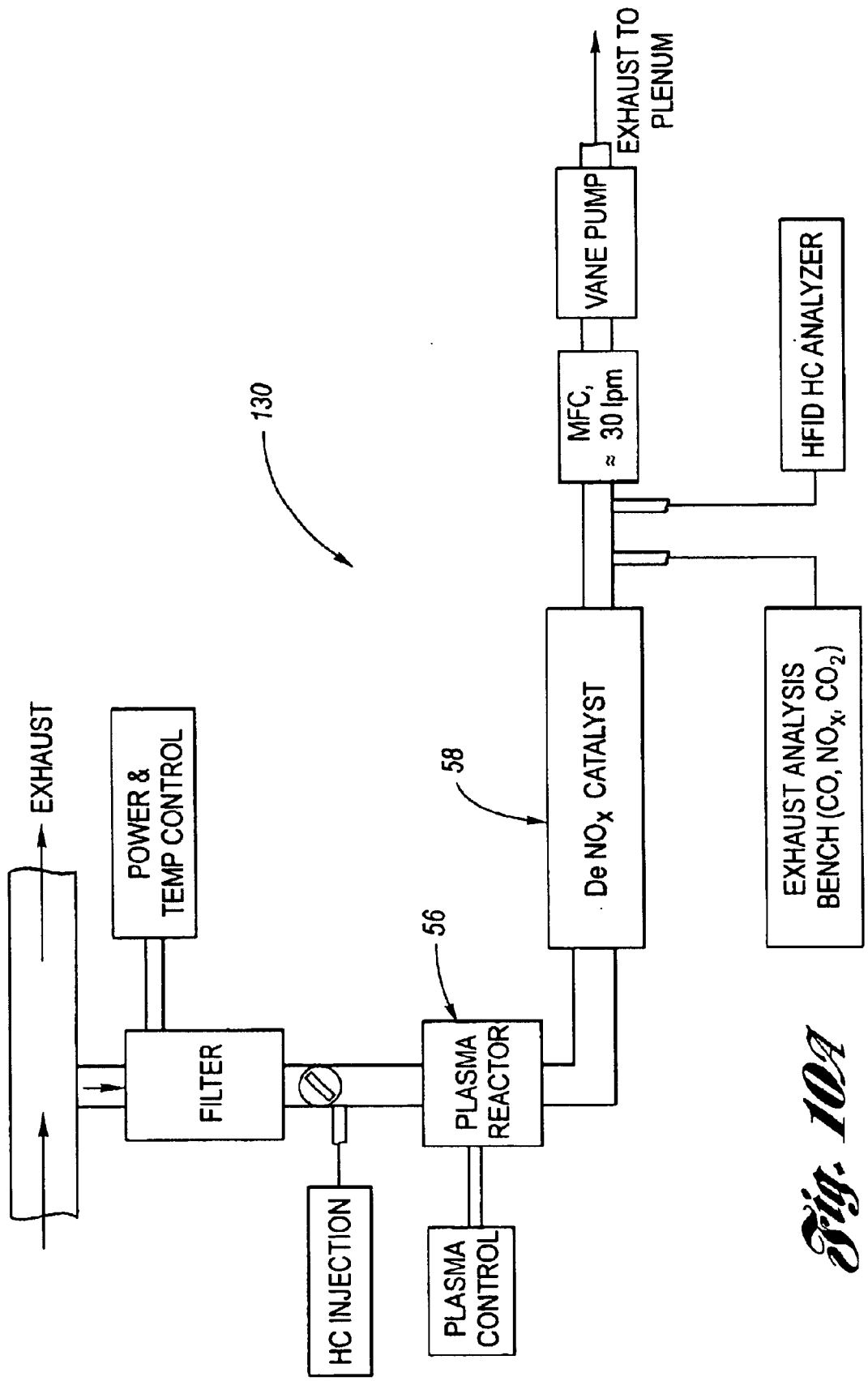
FIGS. 10A and 10B are schematic diagrams of dynamometer tst facilites.
Figure 10B:
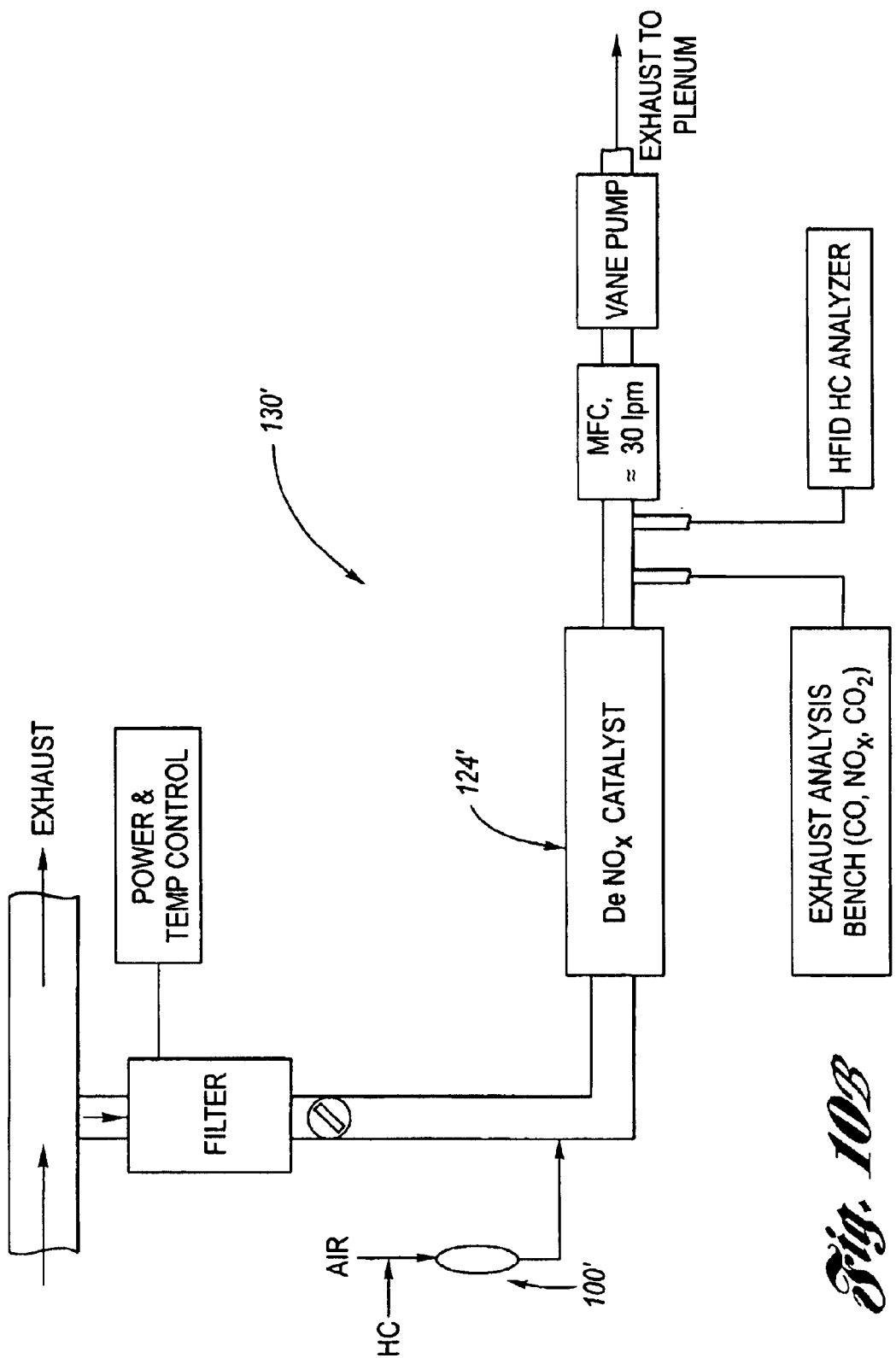

FIG. 10A is the schematic flow diagram in a diesel engine dynamometer test facility 130 where a conventional plasma reactor 56 and a $deNO_x$ catalyst catalytic converter 58 were installed in a exhaust sidestream relation for performance test under diesel engine exhaust conditions. Detailed test conditions are listed in Table II.

TABLE II

Engine (1.3 L, 3 cycl Isuzu):

speed = 2300 rpm
    torque = 25 Nm
    BMEP = 250 kPa
    EGR = 0 to 45%
    fuel = FT
    exhaust temp.: = 217 C.
    exhaust composition:
        HC = 21 ppm($C_3$)
        $NO_x$ = 265 ppm
        $O_2$ = 15%
        $CO_2$ = 3.8%
        CO = 142 ppm Conventional Plasma Reactor:

cylindrical geometry
    SV = 60 K/h
    $E_P$ = 30 J/L
    T = 150 C.

Catalytic Converter:

catalysis = NaY, Ba/NaY
    reactor = 2" diam. pipe, packed bed
    SV = 10 to 30 K/h
    T = 200 C.

Sidestream:

flow rate = 10 to 30 L/min.
    reductant injection = FT fuel, 2-butene

FIG. 10B is a schematic flow diagram in a diesel engine dynamometer test facility 130' using the same Table I, except that now a small cylindrical geometry hyper-plasma reactor 100' according to the present invention was installed in a second sidestream to which a hydrocarbon HC reductant (2-butene) is injected and air is introduced, both before the hyper-plasma reactor. Note that the hyper-plasma reactor 100'' in this second sidestream is used as a hydrocarbon reformer to produce aldehydes from hydrocarbons independently of the engine exhaust stream. The effluent from the hyper-plasma reactor was fed to the main sidestream exhaust before the $deNO_x$ catalyst catalytic converter 124'.

Figure 11:
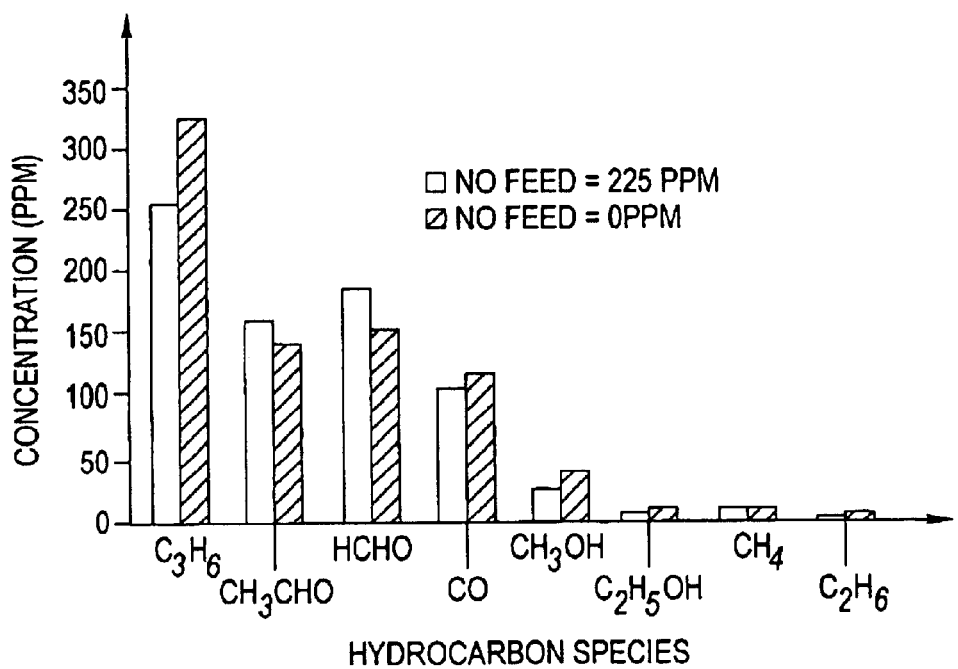
FIGS. 11 through 16 are plots depicting various operational characteristics of the hyper-plasma reactor and the hyper-plasma reactor/catalytic converter system of FIG. 5.

FIG. 11 shows the production of aldehydes from propylene by the hyper-plasma reactor according to the present invention with and without NO in the feed stream thereto. The feed stream maintained a simulated exhaust composition containing 600 ppm propylene, 12% oxygen, 2.5% water vapor, 225 ppm (or 0 ppm for comparison) NO and the balance nitrogen. It is clearly demonstrated by FIG. 11 that aldehydes can indeed be produced in the absence of NO by the hyper-plasma reactor according to the present invention. This discovery compares with the well-established literature reports that the prior art plasma reactors cannot produce a significant amount of aldehydes without NO in the feed stream.

Figure 12:
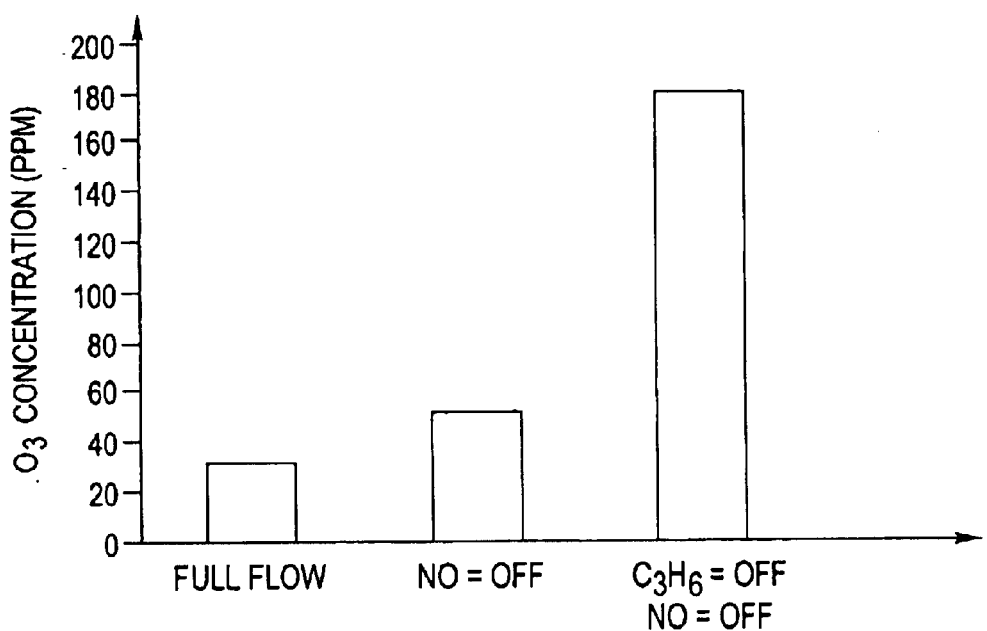

FIG. 12 shows the ozone concentration in the hyper-plasma reactor according to the present invention. The feed stream maintained a simulated exhaust composition containing 600 ppm propylene, 12% oxygen, 2.5% water vapor, 225 ppm (or 0 ppm for comparison) NO and the balance nitrogen. The hyper-plasma reactor had an SV=25 K/h and an energy density of 20 J/L, wherein $O_3$ maintained about 30 ppm. It is clear that most of the ozone produced is consumed by propylene with NO consuming the rest. It is notable that there remains a substantial amount of ozone still available in the hyper-plasma reactor under a full flow condition. This high concentration of ozone is the key enabler of the aldehyde production via "hydrocarbon ozonolysis".

Figure 13:
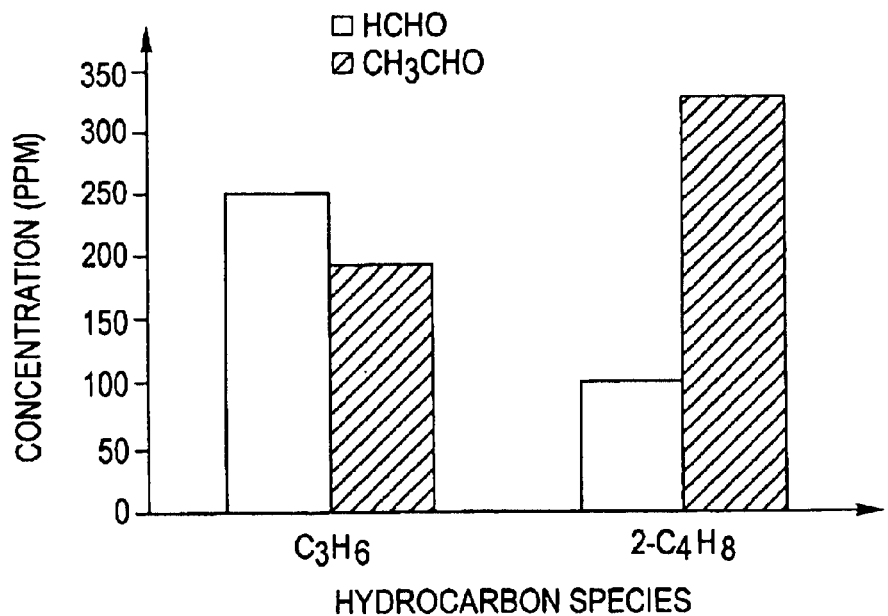

FIG. 13 compares the aldehyde production by propylene and 2-butene. The feed stream maintained a simulated exhaust composition containing 600 ppm propylene (or 450 ppm 2-butene), 12% oxygen, 2.5% water vapor, 225 ppm (or 0 ppm for comparison) NO and the balance nitrogen. The hyper-plasma reactor had an SV=25 K/h and an energy density of 20 J/L. In agreement with the ozonolysis mechanism, 2-butene produces more acetaldehyde (+70%) and less formaldehyde (−60%) than propylene.

Figure 14:
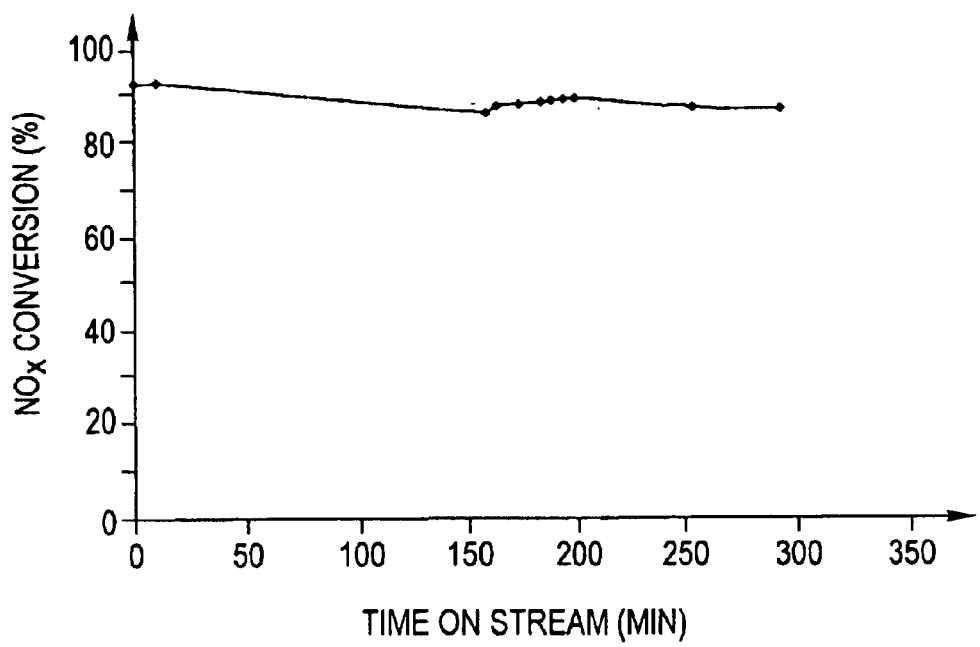

FIG. 14 shows the $NO_x$ conversion performance of the plasma/catalyst system with 2-butene injected as the reductant in the diesel engine dynamometer experiments. The $NO_x$ conversion reached 93% initially, but slowly decreased to a steady-state value of 87% in 5 hours.

Figure 15:
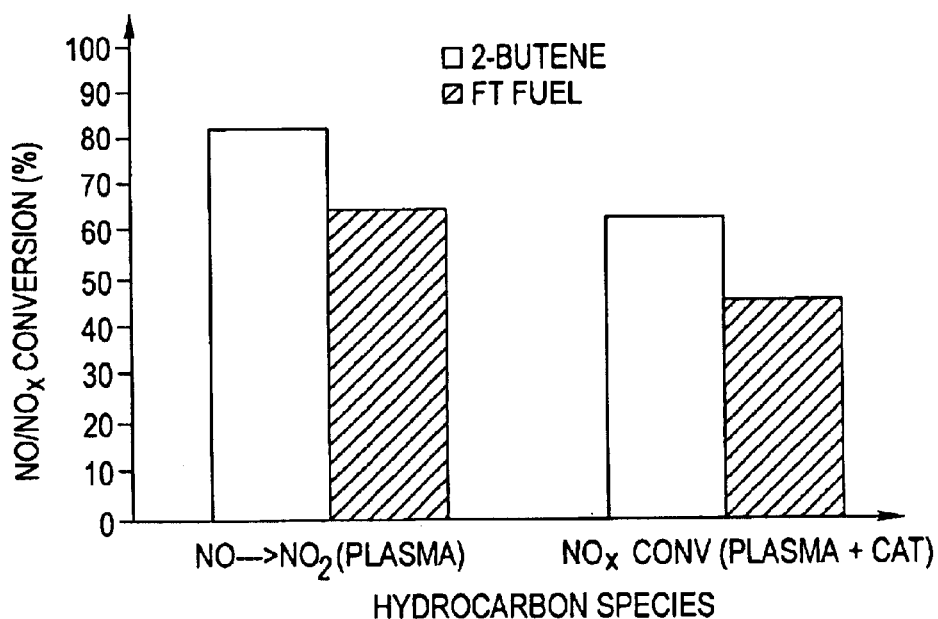

FIG. 15 compares the efficiency of 2-butene and Fisher-Tropsch diesel fuel injected as the reductant. The $deNO_x$ catalyst used in this case was Ba/NaY. As shown in FIG. 15, 2-butene is superior to FT diesel fuel for both the NO-to-$NO_2$ conversion in the plasma reactor and the overall $NO_x$ conversion over the combined plasma/catalyst system.

Figure 16:
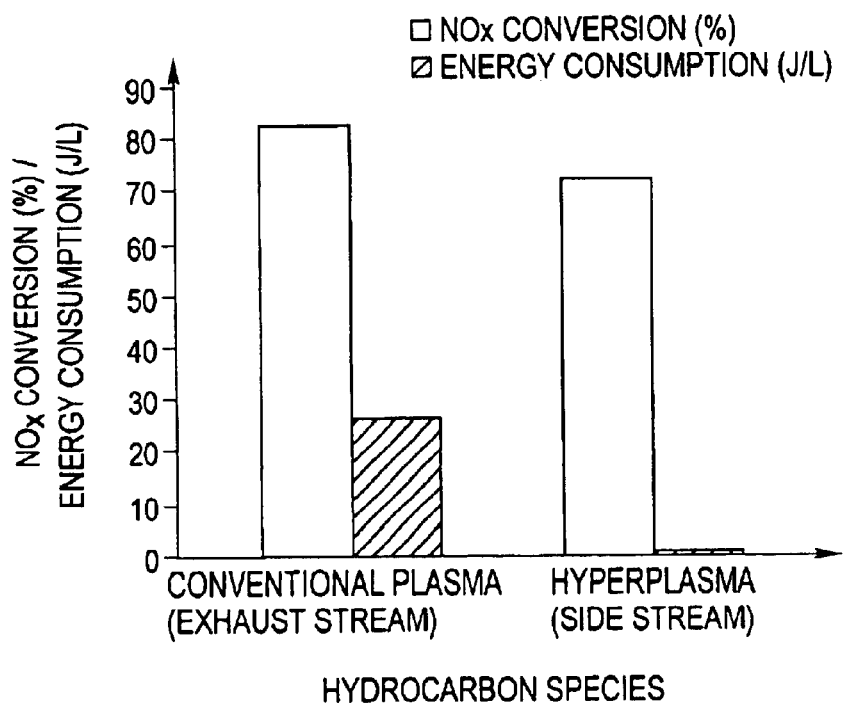

FIG. 16 compares the performance of a conventional plasma reactor 56 with that of the hyper-plasma reactor 100' according to the present invention, when used with a $deNO_x$ catalyst (NaY in this case) as described schematically in FIGS. 10A and 10B, respectively, in terms of the $NO_x$ conversion and plasma energy consumption. It is remarkable that the hyper-plasma reactor used as a sidestream hydrocarbon reformer requires very low power to operate, compared with the prior art plasma reactor used in the main sidestream to treat the engine exhaust. The slight decrease in $NO_x$ conversion (from 87% to 77%) for the hyper-plasma reactor system (FIG. 10B) compared to the conventional plasma reactor system (FIG. 10A) is insignificant, and the present inventors believe this minor undesirable effect can be rectified by optimization of design variables of the hyper-plasma reactor.

In summary, the test results show the following.

1. A hyper-plasma reactor (or hyperactive plasma reactor) provides superior activity for partial oxidation of hydrocarbons. In particular, this novel plasma reactor can produce aldehydes from hydrocarbons in the absence of NO in the gas stream.

2. The hyper-plasma reactor is configured to generate nonuniform electric fields axially in the direction of air movement therethrough, which strengths can be easily tuned to best fit for different hydrocarbon species.

3. The hyper-plasma reactor can produce a large amount of ozone from the engine exhaust gas composition by using a very low plasma power.

4. The NaY catalyst was identified as the best catalyst for the hyper-plasma reactor and catalytic converter system according to the present invention for $NO_x$ reduction in diesel engine exhaust.

5. Among hydrocarbons, 2-butene was identified as the best reductant for the hyper-plasma reactor and catalytic converter system according to the present invention for Ox reduction in diesel engine exhaust.

6. A new method of aldehyde production was proven using the hyper-plasma reactor in a sidestream independent of the engine exhaust (or plasma reformation). This plasma reformation in a sidestream allows selective control the hyper-plasma reactor independently of the $deNO_x$ catalyst and the engine exhaust stream.

7. The new method of aldehyde production according to the present invention allows use of lower power to operate the hyper-plasma reactor at an ultra low level (for example from 600 to 900 W in the case of the conventional system to just 10 to 15 W in this new system, a 60× decrease!).

To those skilled in the art to which this invention appertains, the above described preferred embodiment may be subject to change or modification. For example, the plasma reactor wall may have any suitable geometry. Such change or modification can be carried out without departing from the scope of the invention, which is intended to be limited only by the scope of the appended claims.

What is claimed is:

1. An exhaust gas treatment system for an internal combustion engine, comprising:
    an exhaust stream piping;
    a hyper-plasma reactor having an inlet and an opposite outlet, comprising:
        a dielectric plasma reactor wall, said dielectric plasma reactor wall defining a reactor space;
        an inner electrode disposed within said reactor space in parallel relation to said dielectric plasma reactor wall; and
        an outer electrode adjoining said dielectric plasma reactor wall, said outer electrode being arranged in a sequential pattern comprising a series of discretely spaced apart locations, said sequential pattern being arranged with respect to an axis;
    a first source connected to the inlet, said first source providing air;
    a second source connected to the inlet, said second source providing hydrocarbons;
    a catalytic converter connected to said piping; and
    a connection between the outlet and said piping at an upstream location relative to said catalytic converter;
    wherein the air from the first source mixes with the hydrocarbons from the second source, wherein the mixture passes into the inlet, through the reactor space, and out the outlet.

2. The system of claim 1, wherein said outer electrode is comprised of electrically conductive wire and equivalents thereof; and wherein said inner electrode is disposed substantially centrally and coextensively with respect to said dielectric plasma reactor wall.

3. The plasma reactor of claim 2, wherein said dielectric plasma reactor wall has a cylindrical geometry, and wherein said wire is wound spirally with respect to the axis around said dielectric plasma reactor wall.

4. The system of claim 1, further comprising a time varying high voltage connected to said inner and outer electrodes; wherein said voltage provides, with respect to said inner and outer electrodes and said dielectric plasma reactor wall, sequentially alternating regions of active and passive electric field in a direction along said dielectric plasma reactor wall parallel to the axis.

5. The system of claim 4, wherein each said region of active electric field has an active distance parallel to the axis which is shorter than a passive distance parallel to the axis of any said passive region of electric field, substantially defined by a relation:

$$d \approx h \cdot \cos(\pi/3),$$

wherein d is a length of the regions of passive electric field parallel to the axis, and wherein h is a shortest distance between said inner electrode rod and said outer electrode.

6. The system of claim 5, wherein said sequentially alternating regions of active and passive electric field provide an effective capacitance of said plasma reactor which exceeds an intrinsic capacitance of said plasma reactor.

7. The system of claim 6, wherein said outer electrode is comprised of electrically conductive wire and equivalents thereof; and wherein said inner electrode is disposed substantially centrally and coextensively with respect to said dielectric plasma reactor wall.

8. The plasma reactor of claim 7, wherein said dielectric plasma reactor wall has a cylindrical geometry, and wherein said wire is wound spirally with respect to the axis around said dielectric plasma reactor wall.

9. A method for providing aldehydes, comprising the steps of:
    providing a stream of air along an axis;
    mixing hydrocarbons with the stream of air to provide a hydrocarbon mixed air stream;
    subjecting the mixed air stream to a region of high voltage extending for a short distance parallel to the axis;
    subjecting the mixed air stream immediately thereafter to voltage lower than said high voltage for a long distance parallel to the axis; and
    sequentially repeating a selected number of times said first and second steps of subjecting;
    wherein an ozonolysis of hydrocarbons process ensues in the mixed air stream substantially during the first step of subjecting, and wherein aldehydes are produced by said ozonolysis of hydrocarbons during said first and second steps of subjecting.

10. The method of claim 9, wherein energy is substantially only supplied during each of the first steps of subjecting for ozonolysis of hydrocarbons.

11. The method of claim 10, wherein said mixed air stream is substantially free of NO.

12. A method for treating exhaust gas of an internal combustion engine, comprising the steps of:
    providing a stream of air along an axis;
    mixing hydrocarbons with the stream of air to provide a hydrocarbon mixed air stream;
    subjecting the hydrocarbon mixed air stream to a region of high voltage extending for a short distance parallel to the axis;
    subjecting the hydrocarbon mixed air stream immediately thereafter to voltage lower than said high voltage for a long distance parallel to the axis; and
    sequentially repeating a selected number of times said first and second steps of subjecting to provide an aldehyde mixed air stream, wherein an ozonolysis of hydrocarbons process ensues in the mixed air stream substantially during the first step of subjecting, and wherein aldehydes are produced by said ozonolysis of hydrocarbons during said first and second steps of subjecting;

mixing the aldehyde mixed air stream with an exhaust gas stream of an internal combustion engine to provide an aldehyde mixed exhaust gas stream; and treating the aldehyde mixed exhaust gas stream by catalysis.

13. The method of claim 12, wherein energy is substantially only supplied during each of the first steps of subjecting for ozonolysis of hydrocarbons.

14. The method of claim 13, wherein said mixed air stream is substantially free of NO.

* * * * *